(No Model.)

O. E. HARMON.
CULINARY VESSEL.

No. 402,444. Patented Apr. 30, 1889.

Witnesses.
John C Perkins
John H Chase

Inventor.
Orlin E Harmon
By Lucius C West
atty.

UNITED STATES PATENT OFFICE.

ORLIN E. HARMON, OF BLOOMINGDALE, MICHIGAN.

CULINARY VESSEL.

SPECIFICATION forming part of Letters Patent No. 402,444, dated April 30, 1889.

Application filed February 10, 1888. Serial No. 263,615. (No model.)

*To all whom it may concern:*

Be it known that I, ORLIN E. HARMON, a citizen of the United States, residing at Bloomingdale township, Gobleville P. O., county of Van Buren, State of Michigan, have invented a new and useful Improvement in Culinary Vessels, of which the following is a specification.

This invention relates to kettle-bails which have eccentrics at the sides near the kettle-ears for pressing on the cover when the bail is raised and the kettle is tilted; and it has for its object to construct the bail, bail-eyes, and eccentrics all from a single piece of wire, whereby simplicity and cheapness are effected and a saving in time in the manufacture, and besides allowing the bail to yield easily by the contraction and expansion of the spiral eccentrics when in use.

Another object is to produce a simple handle for the back side of the kettle to tilt it by, as below described and claimed.

Figure 1:
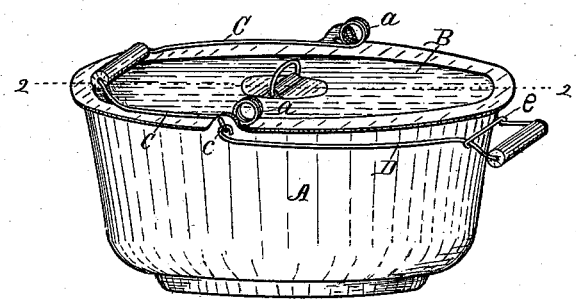
Figure 2:
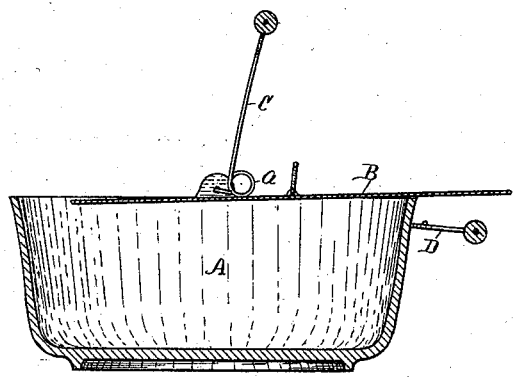

In the drawings forming a part of this specification, Figure 1 is a perspective view, and Fig. 2 is a sectional elevation taken near line 2 2 in Fig. 1.

Referring to the lettered parts of the drawings, A is a kettle or cooking-vessel. The handle or bail C is provided with eccentrics $a$ $a$ near its pivotal connection with the kettle, so that when the bail is down, as in Fig. 1, the cover B will pass beneath them; but when the bail is raised, as in Fig. 2, the eccentrics will press down on the cover and hold it clamped on the kettle. In Fig. 2 the cover B is shown partly slid off, as in the act of pouring water off from the food being cooked.

The eccentrics are made by forming spirals $a$ $a$ in the wire of which the bail is composed, near the ends of said bail, and the ends of the wire are inserted in the ears of the kettle near one side, so as to hinge the handle to the kettle by bending eyes in said ends and leave the spirals eccentrically to said hinges and bail. Thus the bail and eccentrics are all formed from one piece of wire and are quickly and cheaply produced.

At D is shown a handle to be put on the side of kettles which do not have handles. It consists of a wire attached at each end to the pivotal end of the bail C, which comes through the ear of the kettle at $c$, Fig. 1, and embraces about half of the kettle. It is made large, and after being adjusted is closed against the kettle and tied by a wire, $e$, at the handled point proper. So far as the cover-holder is concerned, the handle D may be differently constructed and attached to the kettle; but a side handle is desirable to tilt the kettle by with one hand while the other hand holds the bail. With such an arrangement of bail and handle danger of scalding the hands is obviated and the kettle is more conveniently handled.

Having thus described my invention, what I claim, and desire to secure by Letters Patent, is—

The combination, with a vessel provided with ears, of a bail having spiral eccentrics near its ends, the ends beyond the eccentrics being passed through the ears of the vessel, a bowed handle passed around the sides of the vessel, the ends of the bail and ends of the handle being hooked together, and the tie-wire holding the handle close to the vessel, substantially as set forth.

In testimony of the foregoing I have hereunto subscribed my name in presence of two witnesses.

ORLIN E. HARMON.

Witnesses:
J. E. HYAMES,
M. A. FULLER.